(12) United States Patent
Hirayma et al.

(10) Patent No.: US 7,268,169 B2
(45) Date of Patent: *Sep. 11, 2007

(54) SILICONE ELASTOMER POROUS BODY

(75) Inventors: Naka Hirayma, Shizuoka-ken (JP); Atsushi Ikeda, Numazu (JP)

(73) Assignee: Nitto Kogyo Co., Ltd., Tokyo (JP)

(*) Notice: Subject to any disclaimer, the term of this patent is extended or adjusted under 35 U.S.C. 154(b) by 362 days.

This patent is subject to a terminal disclaimer.

(21) Appl. No.: 10/986,669

(22) Filed: Nov. 12, 2004

(65) Prior Publication Data
US 2005/0143480 A1   Jun. 30, 2005

(30) Foreign Application Priority Data
Dec. 25, 2003   (JP) .............................. 2003-429665
May 11, 2004   (JP) .............................. 2004-141406

(51) Int. Cl.
*C08J 77/00* (2006.01)

(52) U.S. Cl. .......................... 521/154; 521/63; 521/64; 521/110; 521/112; 521/62; 521/72

(58) Field of Classification Search ............... None
See application file for complete search history.

(56) References Cited

U.S. PATENT DOCUMENTS 5,362,761 A * 11/1994 Uragami et al. ............... 521/64
5,804,607 A *  9/1998 Hedrick et al. ................ 521/64

FOREIGN PATENT DOCUMENTS

JP   6-287348   10/1994

OTHER PUBLICATIONS

New application filed concurrently on Nov. 12, 2004, titled "Water-In-Oil Emulsion Composition For Forming Silicone Elastomer Porous Material" by Naka Hirayama et al.

* cited by examiner

*Primary Examiner*—James J. Seidleck
*Assistant Examiner*—Gennadiy Mesh
(74) *Attorney, Agent, or Firm*—Westerman, Hattori, Daniels & Adrian, LLP.

(57) ABSTRACT

A substantially closed-cell silicone elastomer porous body includes cells with diameters of 50 μm or less, which occupy 50% or more of all the cells, and has a closed cell rate of 60% or more.

9 Claims, 1 Drawing Sheet

SILICONE ELASTOMER POROUS BODY

CROSS-REFERENCE TO RELATED APPLICATIONS

This application is based upon and claims the benefit of priority from prior Japanese Patent Applications No. 2003-429665, filed Dec. 25, 2003; and No. 2004-141406, filed May 11, 2004, the entire contents of both of which are incorporated herein by reference.

BACKGROUND OF THE INVENTION

1. Field of the Invention

The present invention relates to a silicone elastomer porous body, and more specifically to a substantially closed-cell silicone elastomer porous body.

2. Description of the Related Art

Silicone elastomer porous bodies are used in a variety of fields, for example, as parts of image forming devices such as photocopiers and laser printers, including developing rollers, toner feeding rollers, transfer rollers and drum cleaning rollers, as sheet feeding rollers of photocopiers, various types of printers and plotters, and as pressure rollers of fixing devices.

Conventionally, porous bodies are produced mainly by utilizing foaming phenomenon. For foaming, a chemical foaming agent, a gas or water has been used as a foaming agent. The manufacture of silicone elastomer porous bodies is not exception, and in most cases, silicone elastomer porous bodies have been prepared by using one of these foaming agents. However, in such a conventional method of producing a silicone elastomer porous body, curing of silicone rubber and foaming are effected at simultaneously, with the result that cells (pores) in the resultant porous body are not uniform in size and their sizes vary in a wide range. Further, it is conventionally difficult to form cells having a small size.

On the other hand, Jpn. Pat. Appln. KOKAI Publication No. 6-287348 discloses a method of producing a silicone elastomer porous body by freezing a room-temperature curing organopolysiloxane emulsion containing an organopolysiloxane having a silanol group, a specific crosslinking agent, a curing catalyst, and an emulsifying agent by refrigeration and sublimating the water to dry the frozen emulsion without defrosting it. Even with this method, it is still difficult to produce a porous body having uniform and fine cells. Further, the porous body obtained by this method is of an open cell type.

Silicone elastomer porous bodies that are produced using foaming agents have cells of large sizes that are uneven from cell to cell. With this structure, when heated, the shape of the porous body is not stable. In addition, when a torque is applied to the porous body, the force cannot be dispersed uniformly therethrough, and therefore the porous body is easily broken. Further, a porous body with large-sized cells entails such a drawback that when it is used for, for example, a pressure roller in an image forming device, the outlines of cells appear on the formed image. Furthermore, when the porous body is of an open cell type, the porous body is easily broken. Under these circumstances, there is a demand for a closed-cell silicon elastomer porous body having cells of a small and uniform size.

BRIEF SUMMARY OF THE INVENTION

Therefore, an object of the present invention is to provide a substantially closed-cell silicone elastomer porous body having a small cell size.

According to an aspect of the present invention, there is provided a substantially closed-cell silicone elastomer porous body, in which cells having diameters of 50 μm or less occupy 50% or more of all cells in the porous body, and which has a closed cell rate of 60% or more.

DETAILED DESCRIPTION OF THE INVENTION

Figure 1:
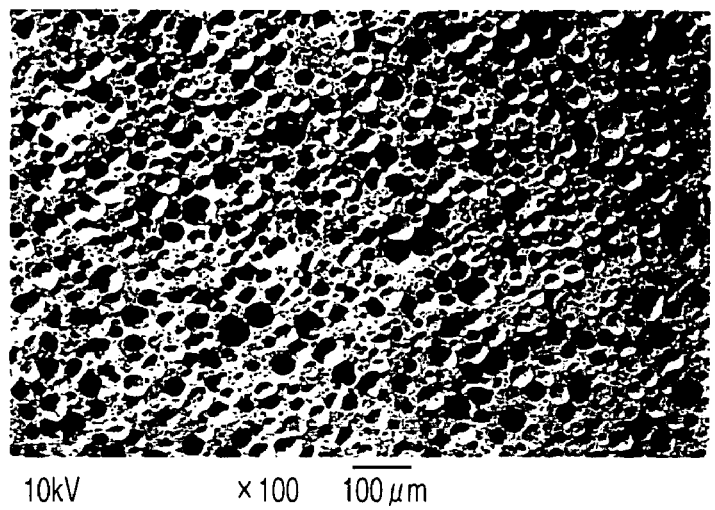
FIG. 1 is an SEM photograph showing a cross section of a silicone elastomer porous body produced in Example 1, which will be explained below in detail.

A closed-cell silicone elastomer porous body can be expressed as comprising a matrix made of a silicone elastomer in which a great number of closed cells (isolated pores) are dispersed and distributed.

The silicone elastomer porous body of the present invention is a substantially closed-cell silicone elastomer in which cells having diameters of 50 μm or less occupy 50% or more of all the cells, and which has a closed cell rate of 60% or more.

When the closed cell rate, which is an index of the proportion of closed cells in number as will be described in detail later, is less than 60%, the strength of the porous body becomes low.

Further, in the silicone elastomer porous body of the present invention, the diameters of the cells can be within a range of 0.1 μm to 70 μm, more preferably in a range of 0.1 to 60 μm. Furthermore, in the silicone elastomer porous body of the present invention, those cells which have diameters of 50 μm or less can occupy 80% or more of all the cells.

In the silicone elastomer porous body of the present invention, those cells which satisfy the relationship between the major diameter and minor diameter, which is expressed by the following formula (A):

$$0 \leq (m-n)/m \leq 0.5 \qquad (A)$$

where m represents the major diameter of a cell and n represents the minor diameter of the cell, can occupy 50% or more of all the cells.

The formula (A) provides a scale indicating how much a cell is close to a sphere (sphericity). In the silicone elastomer of the present invention, those cells that also satisfy the conditions given by the following formula (B) can occupy 80% or more of all the cells:

$$0 \leq (m-n)/n \leq 0.5 \qquad (B)$$

The major diameter m of a cell is the maximum length of a straight line connecting two points on the outline of the cell, that passes through substantially the center of the cell, for each cell appearing on a cross section of the silicone elastomer porous body. The minor diameter n of a cell is the minimum length of a straight line connecting two points on the outline of the cell, that passes through substantially the center of the cell, for each cell. More specifically, an arbitrary cross section of the silicone porous body is photographed under an SEM, and in a region where about 100 to 250 cells are present, the major diameter m and minor diameter n are measured for each cell. The measurements can be carried out manually by using a vernier caliper. It should be noted that the average cell diameter can be obtained by means of image processing. The image processing can be carried out using, for example, an analytic software "V10 for Windows 95 (registered trademark) Version 1.3" available from TOYOBO.

The diameter of a cell corresponds to a value obtained by dividing the sum of the major diameter m and minor diameter n of the cell by 2.

Needless to say, when a cell is a true sphere, m=n.

The silicone elastomer porous body of the present invention can have an average cell diameter of 30 μm or less, or even 10 μm or less.

The porous body of the present invention is uniform in cell size such that the cell size characteristics in the region where 100 to 250 cells are present as described above represent the cell size characteristics of the entire porous body. In other words, the porous body of the present invention exhibits the cell size characteristics defined herein (including the cell size, average cell size, the proportion of cells having sell sizes of 50 μm or less, sphericity, etc.) in a rectangular region where 100 to 250 cells are present on an arbitrary cross section. It has been confirmed that the cell size characteristics in such an arbitrary area on a cross section can represent the cell size characteristics of the entire porous body which has a size up to, for example, 160 mm (width)×400 mm (length)×15 mm (thickness). Conventionally, there has been no such a porous body that can exhibits cell size characteristics defined by the present invention, in its rectangular area where 100 to 250 cells are present.

As described before, the silicone elastomer porous body of the present invention is of a substantially closed-cell type. The rate of the closed cells (isolated pores) to all the cells of the porous body can be expressed by the "closed cell rate". The closed cell rate can be measured in such a manner described in the section of Examples which will be described later. The silicone elastomer porous body of the present invention can have a closed cell rate of 60% or more, or even a closed cell rate of 80% or more.

The silicone elastomer porous body of the present invention can be basically produced from a water-in-oil emulsion which contains a liquid silicone rubber material which forms a silicone elastomer upon curing, and water. When the liquid silicone rubber material has a low viscosity, the liquid silicone rubber material and water can be stirred sufficiently to form an emulsion, which is immediately heated to cure. Nevertheless, the silicone elastomer porous body of the present invention can be suitably produced from a water-in-oil emulsion which contains a liquid silicone rubber material which forms a silicone elastomer upon curing and water, together with a silicone oil material which has a surface activation function.

The liquid silicone rubber material is not particularly limited as long as it forms a silicone elastomer upon curing by heating; however, it is preferable to use a so-called addition reaction curing liquid silicone rubber. The addition reaction curing liquid silicone rubber contains a polysiloxane having unsaturated aliphatic group or groups, acting as a main agent, and an active hydrogen-containing polysiloxane acting as a crosslinking agent. In a polysiloxane having unsaturated aliphatic groups, the unsaturated aliphatic group is introduced at the respective terminals of the molecule, and they can be introduced as side chains as well. Such a polysiloxane having the unsaturated aliphatic groups can be represented by, for example, the following formula (1):

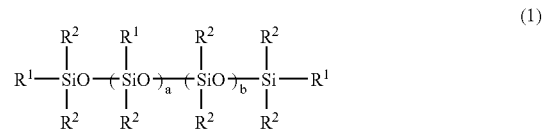

In the formula (1), each $R^1$ represents an unsaturated aliphatic group, and each $R^2$ represents a $C_1$-$C_4$ lower alkyl group, a fluorine-substituted $C_1$-$C_4$ lower alkyl group or a phenyl group. The sum of a and b is usually 50 to 2,000. The unsaturated aliphatic group represented by $R^1$ is usually vinyl group. $R^2$ is usually methyl group.

The active hydrogen-containing polysiloxane (hydrogen polysiloxane) serves as a crosslinking agent for the polysiloxane having unsaturated aliphatic groups, and has a hydrogen atom (active hydrogen) bonded to a silicon atom in its main chain. It is preferable that three or more hydrogen atoms is present per molecule of the active hydrogen-containing polysiloxane. Such an active hydrogen-containing polysiloxane can be represented by, for example, the following formula (2):

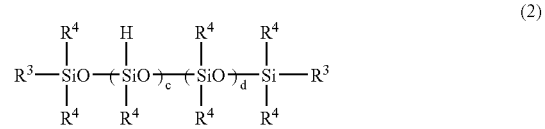

In the formula (2), each $R^3$ represents hydrogen or a $C_1$-$C_4$ lower alkyl group, and each $R^4$ represents a $C_1$-$C_4$ lower alkyl group. The sum of c and d is usually 8 to 100. The lower alkyl groups represented by $R^3$ and $R^4$ are usually methyl groups.

These liquid silicone rubber materials are commercially available. It should be noted that as the products on the market, the polysiloxane containing unsaturated aliphatic groups, constituting an addition reaction curing liquid silicone rubber, and the active hydrogen-containing polysiloxane are provided in separate packages, and a curing catalyst necessary to cure both of these polysiloxanes, which will be later described in detail, is added to the active hydrogen-containing polysiloxane package. Of course, these liquid silicone rubber materials are used in combination.

The silicone oil material having a surface activation function serves as a dispersion stabilizer for stably dispersing water in emulsion. Thus, the silicone oil material having a surface activation function exhibits an affinity for water as well as for the liquid silicone rubber material. It is preferable that this silicone oil material has a hydrophilic group such as an ether group. Further, the silicone oil material exhibits an HLB value of usually 3 to 13, preferably 4 to 11. More preferably, two ether-modified silicone oils having HLB values different from each other by 3 or more are used in combination. In this case, still more preferably, a first ether-modified silicone oil having an HLB value of 7 to 11 and a second ether-modified silicone oil having an HLB value of 4 to 7 are used in combination. Either one of the ether-modified silicone oils may be of a type in which a polyether group is introduced at a side chain of the polysiloxane, which can be represented by, for example, the following formula (3):

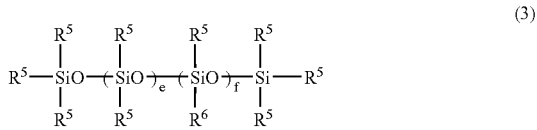

(3)

In the formula (3), each $R^5$ represents a $C_1$-$C_4$ lower alkyl group, and $R^6$ represents a polyether group. The sum of e and f is usually 8 to 100. The lower alkyl group represented by each $R^5$ is usually a methyl group. Further, the polyether group represented by $R^6$ usually includes $(C_2H_4O)_x$ group, $(C_3H_6O)_y$ group or $(C_2H_4O)_x(C_3H_6O)_y$ group. The HLB value is determined mainly by the values of x and y. These liquid silicone oil materials having a surface activation function are commercially available.

Needless to say, in the water-in-oil emulsion described above, water is dispersed in the form of particles (droplets) as a discontinuous phase. As will be described later in detail, the diameter of droplets of water substantially determines the diameter of the cells (pores) of the porous body obtained from the water-in-oil emulsion described above.

In order to cure the liquid silicone rubber material, the water-in-oil emulsion described above may contain a curing catalyst. As the curing catalyst, a platinum catalyst can be employed as is known in the art. It suffices that the amount of the platinum catalyst is about 1 to 100 ppm by weight in terms of platinum atom. The curing catalyst may be added to the water-in-oil emulsion described above when producing a silicone elastomer porous body, or it may be blended when preparing the emulsion described above.

In order to obtain a water-in-oil emulsion with a particularly excellent water dispersion stability, it is preferable that 0.2 to 5.5 parts by weight of the silicone oil material having a surface activation function, and 10 to 250 parts by weight of water are used based on 100 parts by weight of the liquid silicone rubber material. By using an emulsion having such an excellent water dispersion stability, an excellent porous body can be produced more stably.

In the case where the silicone oil material having a surface activation function is composed of a combination of the first ether-modified silicone oil and the second ether-modified oil, described above, it is preferable that 0.15 to 3.5 parts by weight of the first ether-modified silicone oil and 0.05 to 2 parts by weight of the second ether-modified silicone oil (a total of 0.2 to 5.5 parts by weight) are used based on 100 parts by weight of the liquid silicone rubber material. In the case where the liquid silicone rubber material is composed of a combination of a polysiloxane having unsaturated aliphatic groups and an active hydrogen-containing polysiloxane, the ratio between the former and latter in weight is preferably 6:4 to 4:6.

The silicone elastomer porous body of the present invention may contain various types of additives depending on the use. Examples of the additives are colorants (such as pigments and dyes), electrical conductivity-imparting agents (such as carbon black and metal powder) and fillers (such as silica). Further, the water-in-oil emulsion described above may contain a low molecular-weight, non-reactive silicone oil in order to adjust the viscosity of the emulsion for the purpose of, for example, easily performing defoaming of the emulsion. When the water-in-oil emulsion described above has a viscosity of 1 cSt to 200,000 cSt, it can be easily defoamed and therefore it can be handled conveniently.

The water-in-oil emulsion described above can be prepared by various methods. In general, it can be prepared by mixing the liquid silicone material, silicone oil material having a surface activation function and water together with an additive if necessary, and stirring the mixture sufficiently. In the case where the liquid silicone rubber material is provided by a combination of the polysiloxane containing unsaturated aliphatic groups and the active hydrogen-containing polysiloxane, the polysiloxane containing unsaturated aliphatic groups and a portion of the silicone oil material having a surface activation function can be mixed together and stirred to obtain a first mixture, whereas the active hydrogen-containing polysiloxane and the rest of the silicone oil material having a surface activation function can be mixed together and stirred to obtain a second mixture. Subsequently, while mixing and stirring the first mixture and the second mixture, water can be gradually added thereto, and the mixture can be stirred to prepare a desired emulsion. Needless to say, the method of preparing the water-in-oil emulsion is not limited to the above one. The order of addition of the liquid silicone rubber material, silicone oil material having a surface activation function, water and additives that might be added as needed may be arbitrary. The stirring for forming the emulsion can be carried out using an agitator at a rotation speed of, for example, 300 rpm to 1,000 rpm. After the formation of the emulsion, the emulsion can be subjected to a defoaming process without heating it, using, for example, a vacuum decompressor, so as to remove the air present in the emulsion.

In order to produce a silicone elastomer porous body using the water-in-oil emulsion described above, the water-in-oil emulsion described above is subjected to a heat curing (primary heating) condition for the liquid silicone rubber material in the presence of a curing catalyst. In the primary heating, it is preferable to use a heating temperature of 130° C. or less in order to thermally cure the liquid silicone rubber material without evaporating the water in the emulsion. The heating temperature for the primary heating is usually 80° C. or higher, and the heating time is usually about 5 minutes to 60 minutes. By this primary heating, the liquid silicone rubber is cured, and confines the water droplets in the emulsion as they are present in the emulsion. The cured silicone rubber is cured to such a degree that it can withstand the expanding force exerted by the water when the water is evaporated by a secondary heating, which will be described below.

Next, in order to remove the water from the cured silicone rubber confining the water droplets therein, a secondary heating is carried out. The secondary heating is preferably carried out at a temperature of 70° C. to 300° C. If the heating temperature is lower than 70° C., it would take an excessively long time to remove the water, whereas if the temperature exceeds 300° C., the cured silicone rubber may be degraded. With the heating temperature of 70° C. to 300° C., the water is removed by evaporation within 1 to 24 hours. By the secondary heating, the water content is removed by evaporation, and further the final curing of the silicone rubber material can be effected. The water removed by evaporation leave cells having a diameter substantially the same as that of the water droplets, in the cured silicone rubber material (silicone elastomer).

In this way, the water-in-oil emulsion described above can produce a silicone elastomer without being accompanied by a foaming phenomenon. The water droplets within the emulsion are confined in the cured silicone rubber by the primary heating, and then they simply evaporate in the secondary heating.

The silicone elastomer porous body of the present invention can be utilized in various fields. For example, the porous body can be used as parts of image forming devices such as photocopiers and laser printers, including developing rollers, toner feeding rollers, transfer rollers and drum cleaning rollers, as sheet feeding rollers of photocopiers, various types of printers and plotters, and as pressure rollers of fixing devices. All of these rollers have basically the same structure, in which an elastic layer made of the silicone elastomer porous body of the present invention is provided around a core bar. The thickness of the elastic layer differs from one roller to another, but it is usually in a range of about 0.1 mm to 15 mm. The length of the layer does not usually exceed 400 mm at maximum. The outer diameter of the core bar differs from one roller to another, but it is usually in a range of about 5 mm to 50 mm.

The present invention will now be described by way of its Examples, but the invention is not limited to these Examples.

In the Examples described below, the closed cell rate of the silicone elastomer porous body was obtained in the following manner.

<Measurement of Closed Cell Rate>

The silicone elastomer porous body of the present invention has a high surface tension and its cells are very fine. Therefore, water cannot easily enter the porous body. Thus, in order to improve the wettability of the silicone elastomer porous body to water, a surfactant is used.

Specifically, the surface layer (about 1.0 mm from the surface) of the silicone elastomer porous body produced is removed, and the weight of the porous body (the porous body weight before absorbing water) is measured. This porous body is immersed into a mixture solution of 100 parts by weight of water and 1 part by weight of a hydrophilic silicone oil (polyether-modified silicone oil (KF-618 available from Shin-Etsu Chemical Co., Ltd)), and allowed to stand for 10 minutes under a reduced pressure (70 mmHg). Then, the pressure is brought back to atmospheric pressure, and the porous body is taken out of the mixture solution. The water attached to the surface of the porous body is wiped off with cloth and the weight of the porous body (the porous body weight after absorbing water) is measured. Then, the water absorption rate, open cell rate and closed cell rate are calculated from the following equations.

Water absorption rate (%)={(the porous body weight after absorbing water−the porous body weight before absorbing water)/the porous body weight before absorbing water}×100

Open cell rate (%)=(the specific gravity of the porous body×the water absorption ratio/100)/{the specific gravity of the mixture solution−(the specific gravity of the porous body/the specific gravity of the silicone elastomer)}×100

Closed cell rate (%)=100−open cell rate (%).

It should be noted that the specific gravity of the silicone elastomer is that of the one directly obtained by curing the liquid silicon rubber material itself, and it is indicated in the product catalog.

EXAMPLE 1

In this Example, a liquid silicone rubber (trade name: KE-1353) available from Shin-Etsu Chemical Co., Ltd was used as a liquid silicone rubber material. This liquid silicone rubber was provided in the form of separate packages of an active hydrogen-containing polysiloxane (viscosity: 16 Pa·S) and a vinyl group-containing polysiloxane (viscosity: 15 Pa·S), with a catalytic amount of platinum catalyst added to the vinyl group-containing polysiloxane. Hereinafter, the former will be referred to as "silicone rubber precursor A", and the latter will be referred to as "silicone rubber precursor B". The active hydrogen-containing polysiloxane has a structure represented by the above-described formula (2) in which each $R^4$ is a methyl group, whereas the vinyl group-containing polysiloxane has a structure represented by the above-described formula (1) in which each $R^1$ is a vinyl group and each $R^2$ is a methyl group. As the dispersion stabilizers, KF-618 (HLB value: 11), which is a polyether-modified silicone oil available from Shin-Etsu Chemical Co., Ltd. (hereinafter referred to as "dispersion stabilizer I" hereinafter) and KF-6015 (HLB value: 4) available from the same company (hereinafter referred to as "dispersion stabilizer II" hereinafter) were used. The specific gravity of the silicone elastomer itself produced from the liquid silicone rubber material used in this Example was 1.04 (catalog value).

A mixture of 0.7 parts by weight of dispersion stabilizer I and 0.3 parts by weight of dispersion stabilizer II premixed in advance was added to 50 parts by weight of the silicone rubber precursor A, and the resultant mixture was stirred for 5 minutes with a hand mixer to have it fully dispersed, thereby preparing a mixture A. On the other hand, a mixture of 0.7 parts by weight of dispersion stabilizer I and 0.3 parts by weight of dispersion stabilizer II premixed in advance was added to 50 parts by weight of the silicone rubber precursor B, and the resultant mixture was stirred for 5 minutes with a hand mixer to have it fully dispersed, thereby preparing a mixture B.

The mixtures A and B thus obtained were mixed together. Then, while stirring the resultant mixture for three minutes with a hand mixer, 10 parts by weight of water was added thereto and the mixture was further stirred for 2 minutes. While stirring the mixture with a hand mixer, 90 parts by weight of water was gradually added, thereby preparing an emulsion.

The emulsion thus obtained was defoamed in a vacuum decompressor to remove the air entrained in the emulsion. Then, it was poured into a compression mold having a depth of 6 mm, and heated using a stamping disk at a temperature of 100° C. for 30 minutes (primary heating) to mold it. The molded body thus obtained (porous body precursor) was heated in an electric furnace at 150° C. for 5 hours (secondary heating) to remove the water. Thus, a silicone elastomer porous body test piece having a rectangular plate shape with a length of 42 mm, a width of 20 mm and a thickness of 6 mm. This test piece was cut in its width direction, and the cross section was observed under an SEM. Then, the major diameters and minor diameters of cells were measured with a vernier caliper and the cell size characteristics were obtained. Further, with regard to the test piece, the closed cell rate was measured. The results are shown in Table 1 below. The specific gravity of the porous elastomer obtained in this Example was measured to be 0.66 and the hardness (Asker-C) was 40. A photograph of the cross section of the test piece taken under the SEM (magnification of 100 times) is shown in FIG. 1. As shown, a closed-cell porous body having very fine cells of uniform diameters was obtained.

EXAMPLE 2

In this Example, a liquid silicone rubber (trade name: DY35-7002) available from Dow Corning Torey Silicone Ltd. was used as a liquid silicone rubber material. This liquid silicone rubber was provided in the form of separate packages of an active hydrogen-containing polysiloxane (viscosity: 15 Pa·S) and a vinyl group-containing polysiloxane (viscosity: 7.5 Pa·S), with a catalytic amount of platinum catalyst added to the vinyl group-containing polysiloxane. Hereinafter, the former will be referred to as "silicone rubber precursor A", and the latter will be referred to as "silicone rubber precursor B". The active hydrogen-containing polysiloxane has a structure represented by the above-described formula (2) in which each $R^4$ is a methyl group, whereas the vinyl group-containing polysiloxane has a structure represented by the above-described formula (1) in which each $R^1$ is a vinyl group and each $R^2$ is a methyl group. As the dispersion stabilizers, dispersion stabilizers I and II described above were used. The specific gravity of the silicone elastomer itself obtained from the liquid silicone rubber material used in this Example was 1.03 (catalog value).

A mixture of 0.7 parts by weight of dispersion stabilizer I and 0.3 parts by weight of dispersion stabilizer II premixed in advance was added to 50 parts. by weight of the silicone rubber precursor A, and the resultant mixture was stirred for 5 minutes with a hand mixer to have it fully dispersed, thereby preparing a mixture A. On the other hand, a mixture of 0.7 parts by weight of dispersion stabilizer I and 0.3 parts by weight of dispersion stabilizer II premixed in advance was added to 50 parts by weight of the silicone rubber precursor B, and the resultant mixture was stirred for 5 minutes with a hand mixer to have it fully dispersed, thereby preparing a mixture B.

The mixtures A and B thus obtained were mixed together. Then, while stirring the resultant mixture for three minutes with a hand mixer, 10 parts by weight of water was added thereto and the mixture was further stirred for 2 minutes. While stirring the mixture with a hand mixer, 90 parts by weight of water was gradually added, thereby preparing an emulsion.

Figure 2:
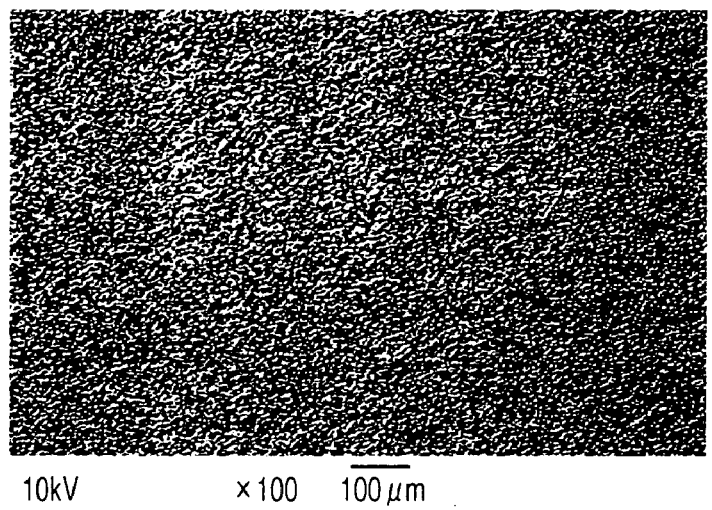
FIG. 2 is an SEM photograph showing a cross section of a silicone elastomer porous body produced in Example 2, which will be below in detail.

From the emulsion thus obtained, a silicone elastomer porous body test piece was prepared as in Example 1. The test piece was measured for the cell size characteristics as in Example 1, and the closed cell rate was measured. The results are shown in Table 1 below. The specific gravity of the porous elastomer obtained in this Example was measured to be 0.55 and the hardness (Asker-C) was 56. A photograph of the cross section of the test piece taken under the SEM (magnification of 100 times) is shown in FIG. 2. As shown, a closed-cell type porous body having very fine cells of uniform diameters was obtained.

EXAMPLE 3

The silicone rubber precursor A and silicone rubber precursor B used in Example 2 were mixed together. Then, while stirring the resultant mixture for three minutes with a hand mixer, 10 parts by weight of water was added and the mixture was further stirred for 2 minutes. While stirring the resultant mixture with a hand mixer, 90 parts by weight of water was gradually added, thereby preparing an emulsion.

From the emulsion thus obtained, a silicone elastomer porous body test piece was prepared as in Example 1. The test piece was measured for the cell size characteristics as in Example 1, and the closed cell rate was measured. The results are shown in Table 1 below. The specific gravity of the porous elastomer obtained in this Example was measured to be 0.53 and the hardness (Asker-C) was 58.

EXAMPLE 4

In this Example, the liquid silicone rubber material used in Example 2 and a liquid silicone rubber (trade name: DY35-615) available from Dow Corning Torey Silicone Ltd. were used. The liquid silicone rubber DY35-615 was provided in the form of separate packages of an active hydrogen-containing polysiloxane (viscosity: 113 Pa·S) and a vinyl group-containing polysiloxane (viscosity: 101 Pa·S), with a catalytic amount of platinum catalyst added to the vinyl group-containing polysiloxane. Hereinafter, the former will be referred to as "silicon rubber precursor A of this Example, and the latter will be referred to as "silicon rubber precursor B of this Example". The active hydrogen-containing polysiloxane has a structure represented by the above-described formula (2) in which each $R^4$ is a methyl group, whereas the vinyl group-containing polysiloxane has a structure represented by the above-described formula (1) in which each $R^1$ is a vinyl group and each $R^2$ is a methyl group.

A mixture of 0.7 parts by weight of dispersion stabilizer I and 0.3 parts by weight of dispersion stabilizer II premixed in advance was added to 50 parts by weight of a mixture of the silicone rubber precursor A of this Example and the silicone rubber precursor A used in Example 2 (volume ratio of 50:50). The resultant mixture was stirred for 5 minutes with a hand mixer to have it fully dispersed, thereby preparing a mixture A. On the other hand, a mixture of 0.7 parts by weight of dispersion stabilizer I and 0.3 parts by weight of dispersion stabilizer II premixed in advance was added to 50 parts by weight of a mixture of the silicone rubber precursor B of this Example and the silicone rubber precursor B used in Example 2 (volume ratio of 50:50). The resultant mixture was stirred for 5 minutes with a hand mixer to have it fully dispersed, thereby preparing a mixture B.

The mixture A and mixture B thus obtained were mixed together. Then, while stirring the resultant mixture for three minutes with a hand mixer, 10 parts by weight of water was added and the mixture was further stirred for 2 minutes. While stirring the resultant mixture with a hand mixer, 90 parts by weight of water was gradually added, thereby preparing an emulsion.

From the emulsion thus obtained, a silicone elastomer porous body test piece was prepared as in Example 1. The test piece was measured for the cell size characteristics as in Example 1, and the closed cell rate was measured. The results are shown in Table 1 below. The specific gravity of the silicone elastomer itself obtained from the liquid silicone rubber material used in this Example was 1.07. The specific gravity of the porous elastomer obtained in this Example was measured to be 0.60 and the hardness (Asker-C) was 35.

COMPARATIVE EXAMPLE 1

Figure 3:
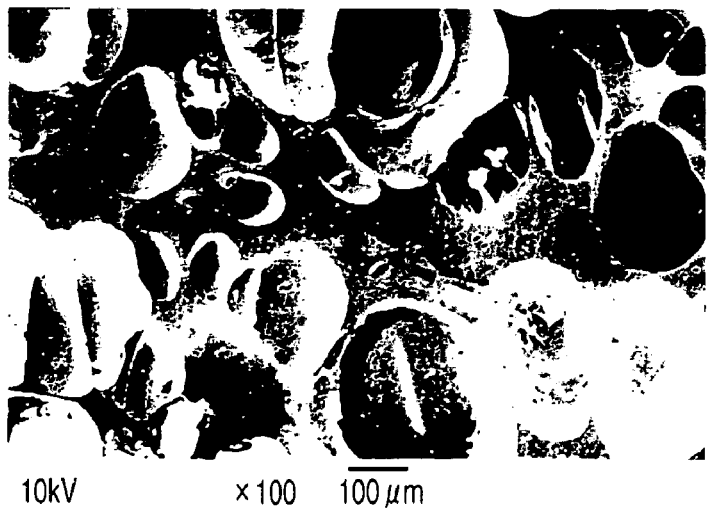
FIG. 3 is an SEM photograph showing a cross section of a formed body prepared in Comparative Example 1, which will be below in detail.

The press roller was removed from a printer Able 1405 available from Fuji Xerox Co., Ltd., and a test piece was cut out from its elastic layer made of the silicon elastomer porous body (obtained by foaming using 2,2-azobisisobutyronitrile as the foaming agent). The test piece was measured for the cell size characteristics as in Example 1, and the closed cell rate was measured. The results are shown in Table 1 below. A photograph of the cross section of the test piece taken under the SEM (magnification of 100 times) is shown in FIG. 3.

TABLE 1

Cell Size Characteristics and Closed Cell Rate of Porous Bodies

| Cell Size Characteristics of Porous Bodies | Example 1 | Example 2 | Example 3 | Example 4 | Comp. Example 1 |
|---|---|---|---|---|---|
| Measured Area (mm$^2$) | 2.54 × 10$^{-1}$ | 2.66 × 10$^{-3}$ | 9.47 × 10$^{-3}$ | 2.65 × 10$^{-2}$ | 7.51 |
| Number of Cells | 179 | 105 | 122 | 250 | 146 |
| Minimum Cell Diameter | 9.1 | 1.1 | 2.3 | 1.5 | 40.7 |
| Maximum Cell Diameter | 60.7 | 9.1 | 40.6 | 12.8 | 628 |
| Rate of Cells satisfying Formula (A) (%) | 100 | 100 | 100 | 100 | 65 |
| Rate of Cells satisfying Formula (B) (%) | 95 | 98.7 | 90.2 | 99.8 | 25 |
| Rate of Cells satisfying both Formulas (A) and (B) (%) | 95 | 98.7 | 90.2 | 99.8 | 16.3 |
| m − n (max.) | 21 | 2.1 | 3.3 | 3.9 | 409 |
| Rate of Cells having Diameter of 50 μm or less | 96 | 100 | 100 | 100 | 1 |
| Average Cell Diameter (μm) | 28 | 4.7 | 6.6 | 4.9 | 207 |
| Closed Cell Rate (%) | 98.4 | 98.2 | 99.2 | 99.7 | 90.5 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A substantially closed-cell silicone elastomer porous body, in which cells having diameters of 50 μm or less occupy 50% or more of all cells in the porous body, and which has a closed cell rate of 60% or more,
    wherein the porous body has been prepared from a water-in-oil emulsion composition comprising a liquid silicone rubber material which forms a silicone elastomer upon curing, a silicone oil material which has a surface activation function, and water,
    wherein the silicone oil material comprises a mixture of a first silicone oil having a hydrophilic group and a second silicone oil having a hydrophilic group, and a difference in HLB value between the first silicone oil and the second silicone oil is at least 3.

2. The porous body according to claim 1, wherein those cells, which satisfy a relationship expressed by a formula (A):

$(A): 0 \leq (m-n)/m \leq 0.5$ where m represents the major diameter of a cell and n represents the minor diameter of the cell, occupy 50% or more of all cells.

3. The porous body according to claim 2, wherein those cells, which satisfy a relationship expressed by a formula (B):

where m represents the major diameter of a cell and n represents the minor diameter of the cell, occupy 50% or more of all cells.

4. The porous body according to claim 1, which has an average cell diameter of 30 μm or less.

5. The porous body according to claim 1, which has a closed cell rate of 80% or more.

6. The porous body according to claim 1, wherein the diameters of the cells are within a range of 0.1 μm to 70 μm.

7. The porous body according to claim 1, wherein each of the first and the second silicone oil comprises an ether-modified silicone oil.

8. The porous body according to claim 1, wherein the first silicone oil has an HLB value of 7 to 11 and the second silicone oil has an HLB value of 4 to 7.

9. The porous body according to claim 1, wherein the emulsion composition comprises 100 parts by weight of the liquid silicone rubber material, 0.15 to 3.5 parts by weight of the first silicone oil, 0.05 to 2 parts by weight of the second silicone oil, and 10 to 250 parts by weight of the water.

* * * * *

UNITED STATES PATENT AND TRADEMARK OFFICE
CERTIFICATE OF CORRECTION

PATENT NO. : 7,268,169 B2 Page 1 of 1
APPLICATION NO. : 10/986669
DATED : September 11, 2007
INVENTOR(S) : Naka Hirayama et al.

It is certified that error appears in the above-identified patent and that said Letters Patent is hereby corrected as shown below:

On the Title Page:
Item (75) change "Naka Hirayma" to be --Naka Hirayama--

Signed and Sealed this

Fourth Day of December, 2007

JON W. DUDAS
*Director of the United States Patent and Trademark Office*